United States Patent [19]

Eick et al.

[11] Patent Number: 5,636,350
[45] Date of Patent: Jun. 3, 1997

[54] USING SYMBOLS WHOSE APPEARANCE VARIES TO SHOW CHARACTERISTICS OF A RESULT OF A QUERY

[75] Inventors: Stephen G. Eick, Naperville; Graham J. Wills, Lisle, both of Ill.

[73] Assignee: Lucent Technologies Inc., Murray Hill, N.J.

[21] Appl. No.: 689,589

[22] Filed: Aug. 12, 1996

Related U.S. Application Data

[63] Continuation of Ser. No. 111,087, Aug. 24, 1993, abandoned.

[51] Int. Cl.⁶ ............................ G06F 3/14; G06F 17/30
[52] U.S. Cl. .................. 395/356; 395/349; 395/339; 395/968; 395/140; 395/601
[58] Field of Search ............................ 395/161, 155, 395/156, 160, 159, 140, 600

[56] References Cited

U.S. PATENT DOCUMENTS

| | | | |
|---|---|---|---|
| 5,062,074 | 10/1991 | Kleinberger | 395/600 |
| 5,136,690 | 8/1992 | Becker et al. | 395/161 |
| 5,175,814 | 12/1992 | Anick et al. | 395/161 |
| 5,261,093 | 11/1993 | Asmuth | 395/600 |
| 5,265,246 | 11/1993 | Li et al. | 395/600 |
| 5,345,544 | 9/1994 | Iwasaki et al. | 395/140 |
| 5,381,158 | 1/1995 | Takahara et al. | 395/161 X |
| 5,499,368 | 3/1996 | Tate et al. | 395/600 |
| 5,555,354 | 9/1996 | Strasnick et al. | 395/155 X |

OTHER PUBLICATIONS

X. Lin, "Visualization for the Document Space", IEEE, 1992, pp. 274–281.

*Primary Examiner*—Raymond J. Bayerl
*Attorney, Agent, or Firm*—Gordon E. Nelson

[57] ABSTRACT

A technique for displaying the results of a query on a database. The technique associates a subquery of the query with a space in a display and represents the results of the subquery by means of a symbol whose appearance varies with a characteristic of the results of the subquery. The technique may be used with queries on a data base of statistical articles. The display is a grid with each field of the grid representing a journal-year pair. A symbol appears in the field if a search of the data base results in a minimum number of hits in the year and journal represented by the pair. The appearance of the symbol varies with properties such as the number of hits and the number of pages in the hits. Bar graphs along the sides of the grid indicate total numbers of hits per journal and year. The symbol for a given journal-year pair changes its color when the pointer is moved over it, and if a mouse button is depressed when the pointer is over the symbol, the data base references for the hits corresponding to the journal-year pair are displayed in an article view window. Sliders control the number of hits required for the display of a symbol and the size of the symbols. The implementation employs memory mapping and caching techniques to achieve rapid generation of a display from the results of a search.

20 Claims, 6 Drawing Sheets

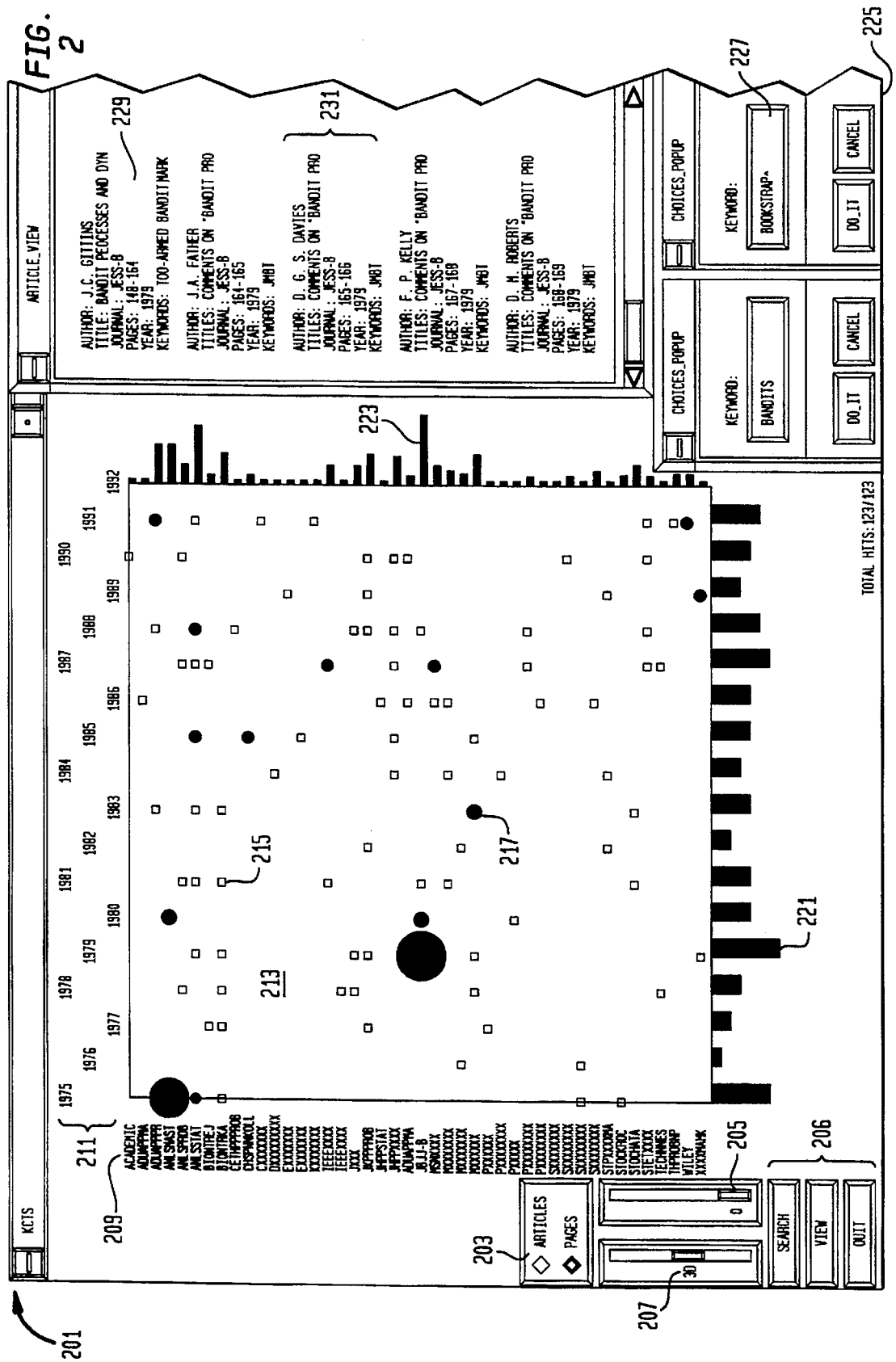

USING SYMBOLS WHOSE APPEARANCE VARIES TO SHOW CHARACTERISTICS OF A RESULT OF A QUERY

This is a continuation of application Ser. No. 08/111,087 filed Aug. 24, 1993, now abandoned.

BACKGROUND OF THE INVENTION

1. Field of the Invention

The invention concerns graphical displays in computer systems in general and graphical displays of the results of queries in particular.

2. Description of the Prior Art

As computers have become cheaper and more powerful, interactive data base systems have become widely available. Users in many different areas of endeavor employ interactive data base systems to find items of information in a large collection of information. A user of an interactive data base system provides the data base system with a query which the user believes will describe the items of information being sought. The data base system then responds to the query by returning a result which includes all of the information in the data base system which satisfies the query. The result generally also includes a value which indicates the number of hits, that is, the number of items of data which satisfy the query.

FIG. 1 is a block diagram of an example interactive data base system 101. The system includes terminal 103, which provides output to and receives input from the user, processor 113, which performs the actual searching operations, and memory system 115, which contains programs 119 executed by processor 113 and data base 117 which contains the data. In more detail, terminal 103 includes a display screen 105, upon which processor 113 displays information for the user. Display screen 105 also includes pointer 107, which specifies a location in display 105 and may be moved under control of either keyboard 109 or mouse 111. The user controls the operation of system 101 by inputs from keyboard 109 and/or mouse 111. Processor 113 may be any kind of processor, from a personal computer through a supercomputer. Memory system 115, finally, includes any data accessible to system 101, and may thus include random-access memory, a file system on magnetic or optical disk, or even remotely-located data bases. When employing system 101 to find information in data base 117, the user inputs a query using keyboard 109 or mouse 111; processor 113 executes programs 119 as required to perform the query on data base 117 and returns the number of hits and the results to display screen 105. The user can then use keyboard 109 and/or mouse 111 to examine the results in more detail.

The usefulness of interactive data base systems like system 101 is attested to by their popularity; present systems do, however, have their limitations. A recurring source of frustration among users of interactive data base systems is that the systems always seem to return either too little or too much information. A user is typically looking for a half a dozen good pieces of information; queries typically produce no hits or a hundred; when the query produces no hits, the user must broaden it, whereupon it produces hundreds; when it produces too many, the user must narrow it, whereupon it produces no hits. Very often, even experienced users are at a loss to find a query which will produce a useful number of hits.

The problems caused by large numbers of hits are aggravated by the fact that interactive data base systems typically only specify the number of hits, and thus provide no information which the user can take advantage of to subdivide the collection of hits. This tendency to treat the hits as a "black bag" also makes it difficult to use interactive data base systems to investigate questions like the relationship of the hits to a period of time or to a set of authors. It is an object of the invention to solve these and other problems of interactive data base systems.

SUMMARY OF THE INVENTION

The invention solves the foregoing problems by means of a display on display screen 105 which uses spaces on display screen 105 to represent subqueries and symbols of various types and sizes in the spaces for the subqueries to represent a characteristic of the hits for the subquery. In a preferred embodiment, the data base being queried is a data base of statistical literature and the display technique is to position the hits on a year by publication grid with a scaled symbol coding the number of hit articles in each publication for the year. The scale of the symbol is proportional to the number of hits; the symbol for exactly one hit is a square, with a circle for two or more hits. The user can further employ the mouse to interact with the symbols to gain more information. The technique makes it possible to display selected characteristics of large volumes of information in a fashion which makes it easy for the user to interpret the information.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 2 is a picture of the display in a preferred embodiment;

Figure 1:
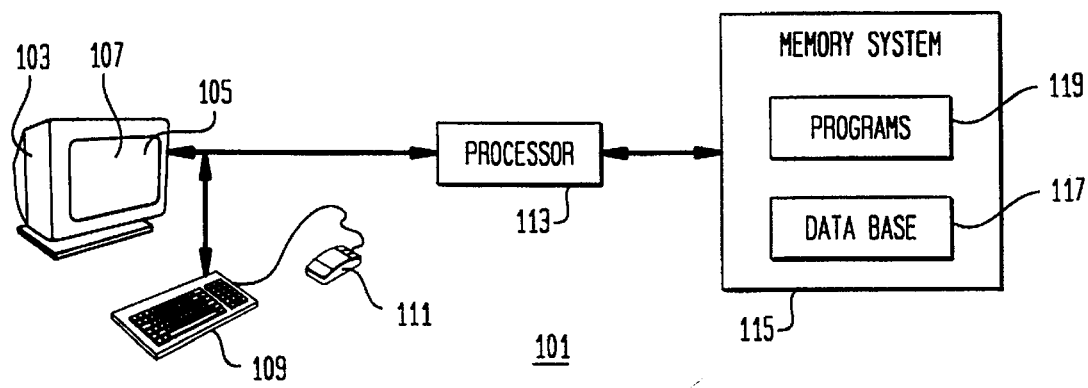
FIG. 1 is a block diagram of an interactive data base system.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first present a description of a preferred embodiment from the point of view of a user and will then describe the implementation of the preferred embodiment in detail.

Environment of the Preferred Embodiment

The preferred embodiment runs under the UNIX operating system using the X11 graphics system with the Motif widget set. (UNIX is a registered trademark of Unix Systems Laboratories). The system upon which the preferred embodiment executes is a Silicon Graphics Indigo workstation. Speed is achieved by using an inverted index, several layers of caching, and memory mapped IO. By carefully caching the indices, the system can resolve many keyword or author searches in a fraction of a second. Memory mapping each of the index files increases speed by saving IO overhead. Each search is cached after it completes, so that executing it again will be nearly instantaneous. Screen updates are double buffered using off-screen X pixmaps.

The data base to which the preferred embodiment is applied is the 1992 Current Index of Statistics (CIS) database. This data base is a reference data base for statistics which contains 128,000 references to statistical literature published during the last twenty years. There is an entry for each article or book. The entry contains the following information about the article or book:

list of the authors of the article;
the title;
the journal;
the volume of the journal;
the beginning page of the article;
the end page of the article;
the year the article appeared; and
a list of keywords describing the contents of the article.

The data base contains neither citation cross references nor the text of the articles.

The Display: FIG. 2

FIG. 2 shows display 201 on display screen 105 of the results of a query on data base 117 (the CIS data base) in a preferred embodiment. The query was a search on the keyword bandits. In the preferred embodiment, display 201 is a window in display screen 105. At the center of display 201 is grid 213. At the left of grid 213 are journal names 209, a list of the names of those journals in the CIS data base which contain articles for which bandits is listed as a keyword. At the top is a list of years 211 from 1975 through 1991. Both the names and the years are displayed in white. If the search results in at least some minimum number of hits for a journal in a year (i.e, if the journal published at least that number of articles whose entries in the data base have the keyword being searched on), a symbol is displayed at the point where a horizontal line extending from the journal name meets a vertical line extending from the year. The symbol thus represents the results of a subquery of the data base which has been limited to the journal and year represented by the symbol's location. The symbol's shape, size, and color all indicate information about the hits. In display 201, the minimum number of hits is 1; a small square 215 indicates a single hit; circles 217 indicate more than one hit, with the size of the circle being proportional to the number of hits. Colors also indicate the number of hits; when the symbol represents a single hit, it is white; when it represents two hits, it is blue; when it represents three, it is yellow, and when it represents more than three hits it is red.

As is immediately apparent from FIG. 2, grid 213 shows the user immediately what journals are important for the subject he or she is interested in and the activity in the subject area over time. Further information is provided by bar plot 221 at the bottom of grid 213 and bar plot 223 at the right hand side of the grid. Bar plot 221 is a plot of the number of hits (that is, articles on the search subject) by year; bar plot 223 is a plot of the number of hits by journal. Again, the user immediately sees what journals and what years are important for the subject matter he or she is interested in.

Interactive Operation of Display 201

Display 201 is controlled by means of a pointing device such as mouse 111. In a preferred embodiment, mouse 111 has three buttons; however, only the leftmost button is involved in the user interaction with display 201. When pointer 107 (not shown in FIG. 2) controlled by mouse 111 moves over a symbol 215 or 217, the year and journal for the symbol and the lines connecting the symbol with the year and the journal are displayed in green and the journal and year of publication appear in green below grid 213; when pointer 107 moves over a symbol with the leftmost button depressed, information 231 from the data base entries represented by the hits appears in article view window 229, which is implemented as a Motif scrollable text window. The user can then use mouse 111 to scroll through the information represented by the selected symbol.

Further control is by means of buttons and sliders around the margins of display 201. The buttons and sliders are operated by means of mouse 111. Buttons 206 specify the modes of operation: searching, in which the data base is searched using a keyword, displaying, in which the results of the search are displayed in grid 213, and quit, which terminates execution of the program of programs 119 which produces display 201. Hit type selector 203 consists of two radio buttons, one for articles and the other for pages. When the button for articles has been pushed, the symbols in grid 213 indicate numbers of articles; when the button for pages has been pushed, they indicate the number of pages in the hits represented by the symbol. Sliders 207 and 205 control grid 213. Slider 207 proportionally scales and shrinks all symbols, and thereby lets the user deal with overlaps of symbols; slider 205 establishes a threshold for the display of symbols; a symbol is displayed only if the number of hits is greater than the threshold. Field 225 in display 201 shows the ratio of hits being displayed to the total hits. In FIG. 2, slider 205 specifies a threshold of 1, and consequently, all hits are being displayed.

A search is specified as follows: when the search button in buttons 206 is indicated, a choices-popup window 227 appears at the lower right-hand corner of display 201. Window 207 includes a field for specifying an author name or keyword and a Do It button. The user moves the pointer to the field and then employs keyboard 109 to input the author name or keyword; when that's done, the user employs mouse 111 to press the Do It button to perform the search using the name or keyword specified in the field. When display 201 is placed in the display mode, the results of the search are displayed. There may be more than one window 207; in display 201, there are two. In the preferred embodiment, the encaching of the query results makes redrawing of grid 213 almost instantaneous; consequently, the results of several searches can be compared by placing the display in display mode and pressing the Do It buttons for the searches in rapid succession.

Other Examples of Grid 213

Figure 3:
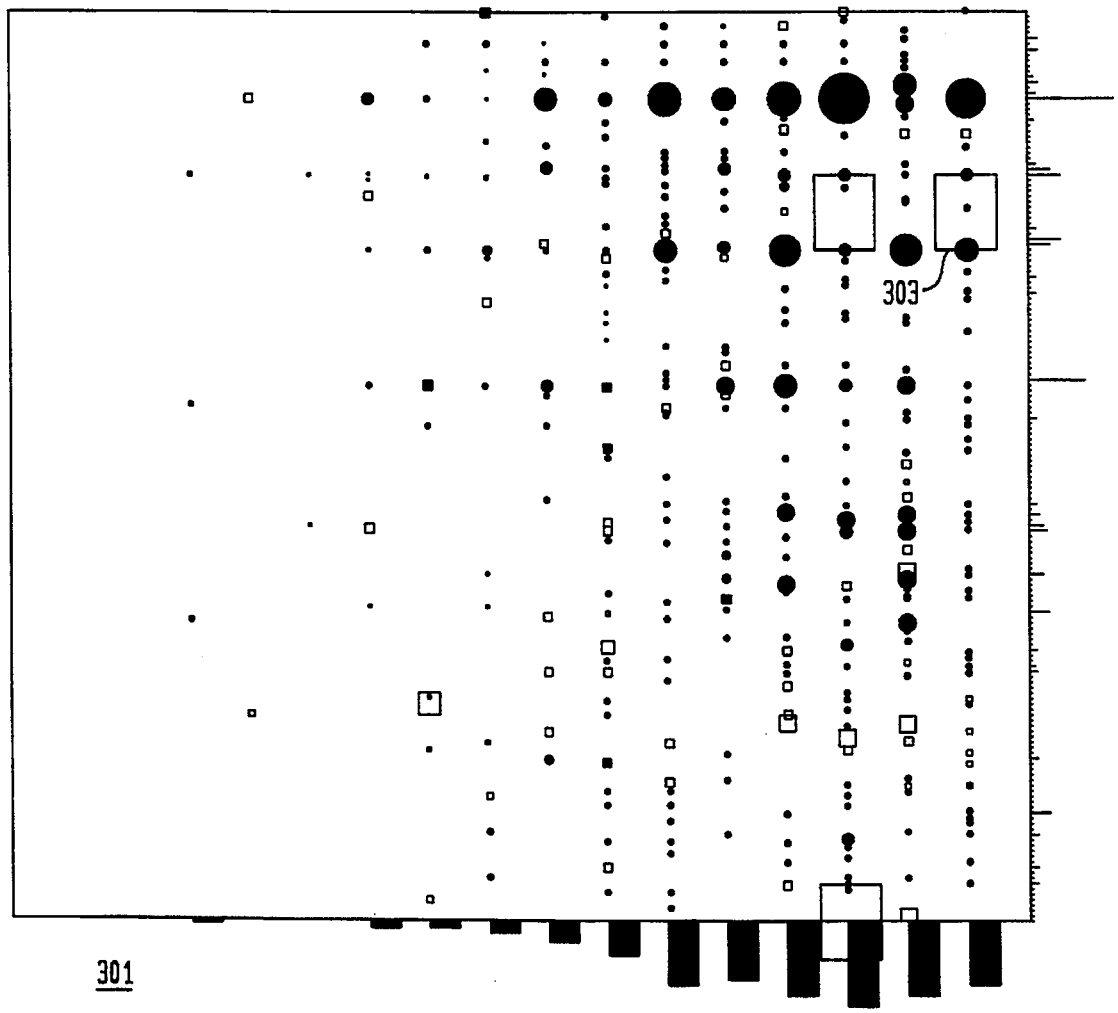
FIG. 3 is a picture of a grid which is displaying numbers of pages.
Figure 4:
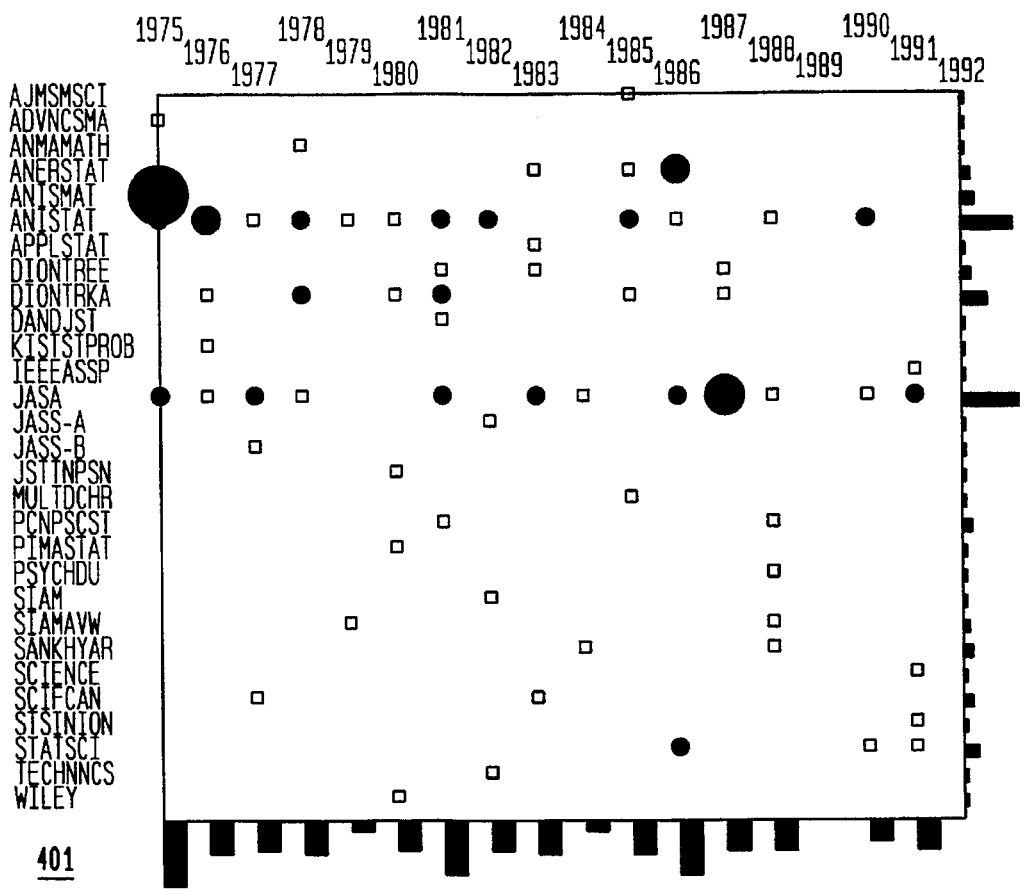
FIG. 4 is a picture of a grid which is displaying the results of a search using an author name.

FIG. 3 shows grid 301 in which the symbol shape represents the number of hits as before, but the symbol size represents the number of pages in the hits. Thus, a large box such as 303 represents a single reference with a large number of pages, or in other words, a book on the subject being searched. In a preferred embodiment, the symbol size is a function of the relationship between the number of pages in the hits for the symbol to the maximum number of pages in the hits for any symbol. FIG. 4 shows how display 201 can be used to research the places and times of publication by an author on a subject. Grid 401 is a result of a search on the author name Bradley Efron. It shows that according to the 1992 version of the CIS database Efron has published 93 articles. The two most frequent locations of Efron's articles are *JASA* and the *Annals of Statistics*. Other likely locations are *The American Statistician*, *The Annals of Mathematical Statistics*, and *Biometrica*. The page display (not shown) indicates that he wrote one book, in 1980. One particularly interesting feature of grid 401 is that it clearly shows that Efron has a low publication year every five years.

Other Uses of Display 201

Of course, displays built on the principles of display 201 can be used in many other areas. One example would be a display used with a legal data base. In such a display, each field in the grid could represent a court-year pair; the display could then be used to discover which courts had been particularly active in developing a legal doctrine specified in a search term. The display would of course also serve to show how the doctrine came into and fell out of favor over a period of time. A display in which the grid represented company year pairs could be used with a patent data base to investigate the activities of the companies in various areas of technology represented by the search terms. A display in which the grid represented company-technology pairs could be used with the patent data base to investigate foreign patent effort of the companies for the various technologies.

Of course, the use of two limiting factors to define the subquery is particularly advantageous when the symbols are displayed in a grid, but the invention is not limited to the use of two. For example, a three-dimensional display would permit the use of subqueries defined by three limiting factors; the symbols would then appear as three-dimensional bodies in a space defined by the three limiting factors. Additional limiting factors may also be introduced which determine the appearance of the symbols, rather than their locations in the display.

Detailed Implementation

In the following, we will present details of the implementation of a preferred embodiment, beginning with an overview of the method used to produce display 201, continuing with a discussion of the data structures involved, and concluding with a discussion of how the data structures are used to produce the display.

Overview of the Method

In a preferred embodiment, the first step in producing display 201 is an initialization step in which the files making up the search data base are mapped into memory and a hash table is constructed. The hash table permits the quick determination of the locations of all hits on a keyword. The first time a user specifies a search on a specific keyword, the keyword is used with the hash table to construct a hit list of the locations in the search data base of the hits. The hit list is then used with the search data base to construct display data structures used to generate the display, and the display is then generated from those data structures. The hit list is retained in memory until the choices-popup window 227 specifying the search which produced the hit list is closed, and consequently, once a search has been done, its results may be quickly redisplayed.

Figure 5:
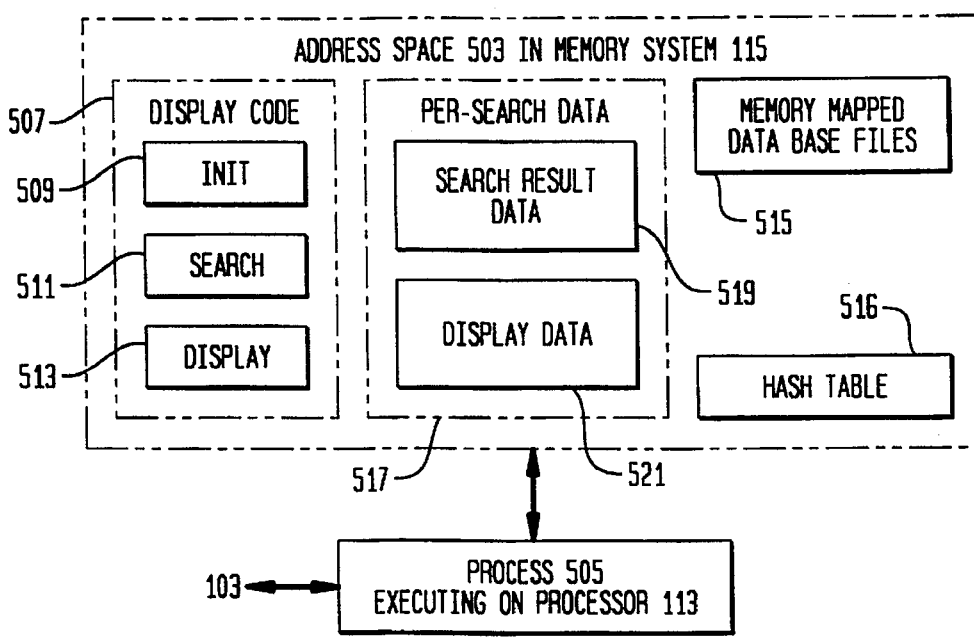
FIG. 5 is an overview of a process 505 which produces display 201.

Overview of a Process Producing a Display 201: FIG. 5

In a preferred embodiment, display 201 on terminal 103 is produced by a process running on processor 113 and responding to inputs of the user at terminal 103. FIG. 5 gives an overview of that process. Process 505 has address space 503, by means of which process 505 may reference data in memory system 115. Address space 503 includes display code 507, which is the code executed by process 503 when producing display 201 and interacting with users of terminal 103 upon which display 201 is being displayed. Important components of display code 507 are initialization code 509, which initializes the structures used to perform the search, search code 511, which performs the search, and display drawing code 513, which produces display 201 on terminal 103.

The data used by process 505 falls into two categories: data which is used by all searches and displays and data of which there is a copy for each search and for each display of a search. The data which belongs to the first category is memory mapped data base files 515 and hash table 516. Memory mapped data base files 515 are the files containing the data. These data base files 515 have been directly mapped into process 505's address space 503, so that process 505 can access the contents of the data base files 515 by means of relatively rapid memory references rather than much slower file I/O operations. Hash table 516 contains an entry for each key in the indexes in data base files 515. The contents of the entry is a list of the locations of the first occurrence of that key in the actual data files of the data base. When given a key, the hash table quickly produces the list of locations for the key. Per-search data 517 includes search result data 519 and display data 521. The most important part of search result data 519 is a list of the locations of all of the hits on the search in data base files 515. As mentioned above, search result data 519 is retained as long as there is a window 227 specifying the search. Display data 521 is the data structures which process 505 uses when executing display portion 513 of code 507 to produce display 201 on terminal 103.

Figure 6:
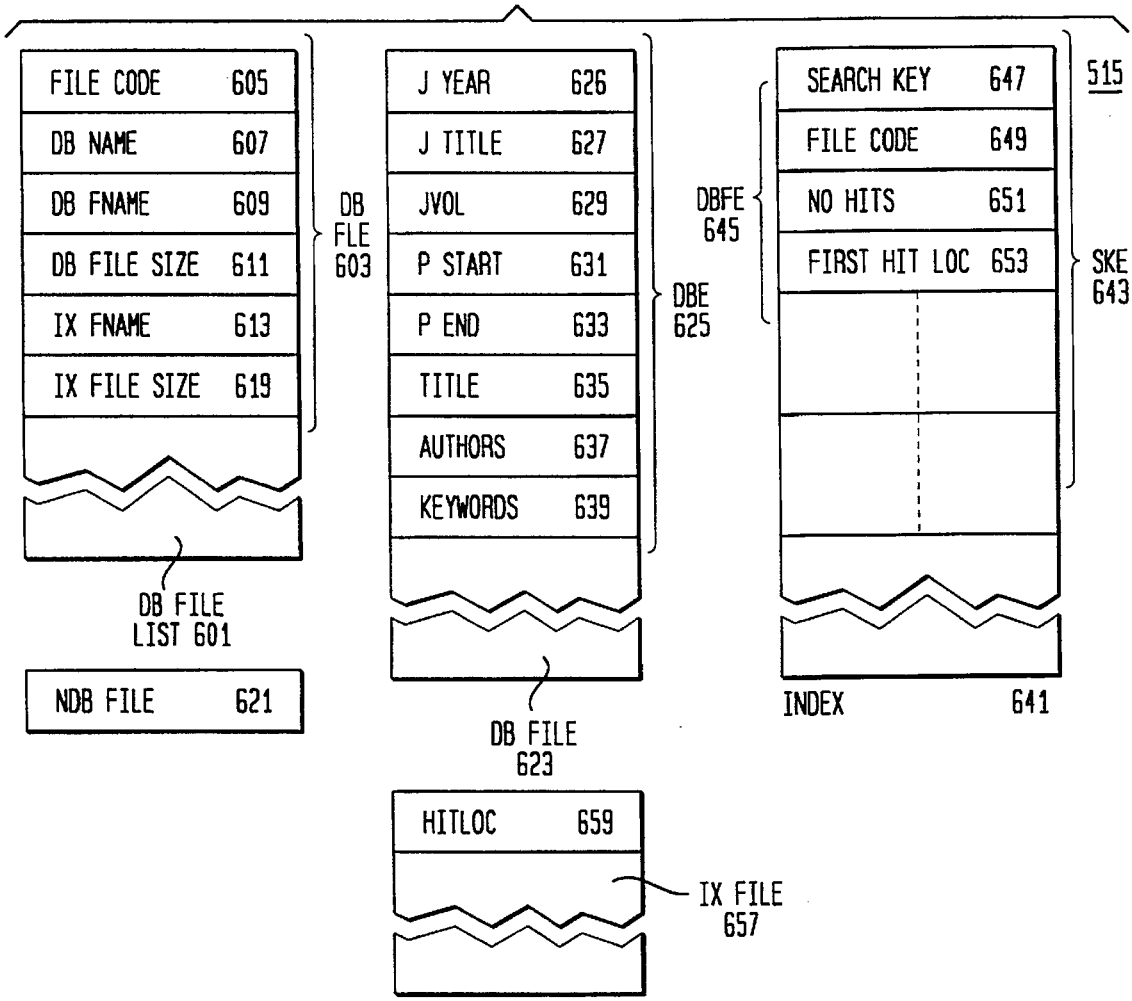
FIG. 6 is a detail of data base files 515.

Details of Memory Mapped Data Base Files 515: FIG. 6

FIG. 6 shows the details of memory mapped data base files 515. There are three kinds of files: a data base file (DBfile) 623 for each year of the database, which contains the actual data, an index file (IxFile) 657 for each data base file 623, which contains a list by order of index key of the locations of each occurrence of the item specified by the index key in data base file 623, and INDEX file 641, which contains a list of hits for all of the data base files 623. In the preferred embodiment, the data base files 623 are provided by the data base provider, along with a software tool for making an Ixfile 657 for each data base file 623 and an INDEX file 641 for the entire data base.

Continuing in more detail with data base files 623, each data base file 623 is identified by a code and by a name. The name is the year for which the data base file 623 contains entries. There is a data base entry 625 in the file for each article published during the year in the journals reported by the data base. Entry 625 contains the following fields:

JYEAR 626, which contains the year of the journal in which the item appeared;

JTITLE 627, which contains the title of the journal in which the article appeared;

JVOL 629, which contains the volume number of the journal;

PSTART 631, which contains the starting page of the article;

PEND 633, which contains the ending page of the article;

TITLE 635, which contains the article's title;

Authors 637, which is a list of the article's authors; and

Keywords 639, which is a list of the keywords which describe the article's content. IxFile 657 is simply a list of pointers 659 to the locations of hits in the data base file 623 to which IxFile 657 corresponds.

In the preferred embodiment, data base files 623 and IxFiles 657 are located for memory mapping by means of data base file list 601, which has a data base file list entry 603 for each data base file 623. The contents of entry 603 are file code 605, an alphanumeric code identifying the data base file 623;

database name 607, the name of the data base contained in file 623; in this case, the name is the year to which the data base entries in the file belong;

data base file name (DBFNAME) 609, which is the actual file name of data base file 623;

data base file size 611, which is the size of data base file 623 in bytes;

index file name (IXFNAME) 613, which is the name of IxFile 657 associated with the data base file 623; and index file size 619, which is the size of the associated IxFile 657.

A static variable 621 contains the number of entries in data base file list 601.

Continuing with index file 641, index file 641 contains a search key entry (SKE) 643 for each search key used to search data base file 623. Each search key entry 643 contains search key 647 and a data base file entry 645 for each data base file 623 in which there is an occurrence (or "hit") of search key 647. Data base file entry 645 for a data base file. contains file code 649 for the file, number of hits 651, which contains the number of hits for search key 647 in the file, and first hit location 653, which specifies the byte in the file at which the first hit appears.

As part of initialization, data base files 623, IxFiles 657, and INDEX file 641 are memory mapped; further, hash table 516 is made from index file 641. Each entry in hash table 516 contains a single search key entry 643 from index file 641, and the search key entry 643 for a search key may be accessed by providing the search key to hash table 516.

Figure 7:
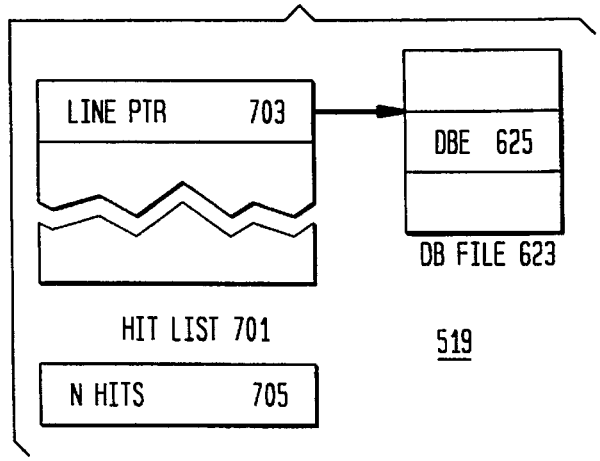
FIG. 7 is a detail of search result data 519.

Details of Search Result Data 519: FIG. 7

Search result data 519 consists of hit list 701 and number of hits 705. Hit list 701 is a list of hits resulting from a single search. The elements of the list are line pointers 703 to data base entries 625 in data base files 623 which contain the keyword or author for which the search was made. NHITS 705 is a variable which specifies the number of elements presently in hit list 701.

Figure 8:
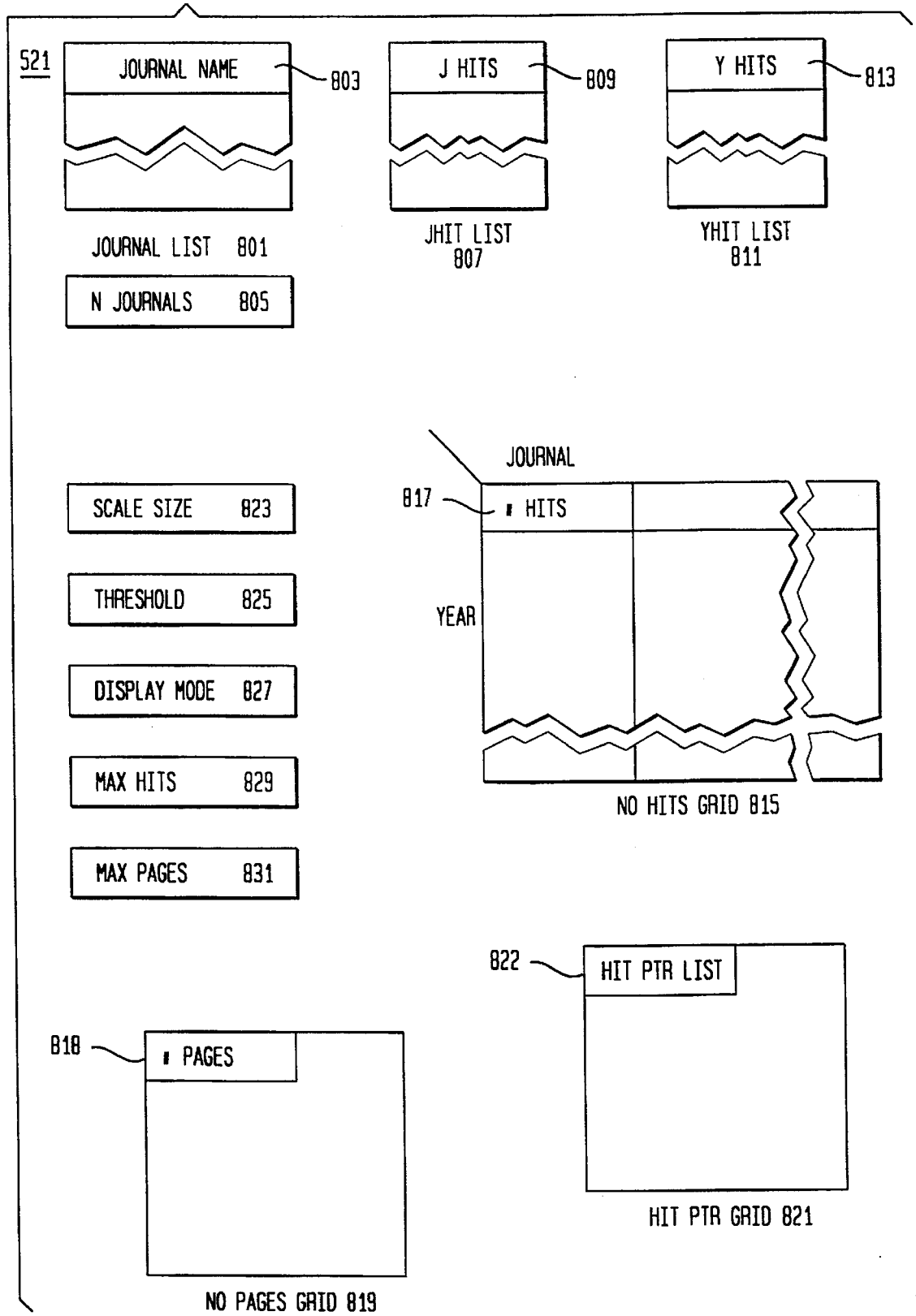
FIG. 8 is a detail of display data 521.

Details of Display Data 521: FIG. 8

Display data 521 contains the information needed to draw display 201 for a given search. First, there is journal list 801, which is a list of the names 803 of all of the journals for which the given search resulted in hits. N JOURNALS 805 indicates the number of journals in journal list 801. JHIT LIST 807 has an entry 809 corresponding to each journal name in journal list 801; journal hits 809 contains the total number of hits produced by the search for the journal represented by the entry 809. YHIT LIST 811 is the equivalent for years; there is an entry 813 for each year contained in the data base, and the entry 813 contains the total number of hits produced by the search for that year.

There are five static variables which control aspects of display 201. The variable scale size 823 is set by slider 207, and indicates the size to which symbols 217 are to be scaled; threshold 825 is set by slider 205, and indicates the number of hits which are required for a symbol 215 or 217 to appear in display 201. Display_mode 827 indicates whether hit numbers or total page numbers are to be displayed, and is set by the radio buttons in hit type selector 203. Maxhits 829 is the largest number of hits in any element 817 of number of hits grid 815, and is computed as grid 815's elements are set; Maxpages 831 is the equivalent value for number of pages grid 819. As will be described in more detail later, these values are used with scale size 823 to compute the sizes of symbols 215 or 217.

Number of hits grid 815 and number of pages grid 819 contain the information used to produce symbols in grid 213. Grid 815 is a two-dimensional array. There is an entry 817 for each journal-year pair, and the entry contains the number of hits produced by the search for that journal-year pair. Number of pages grid 819 is a similar data structure, except that entry 818 for each journal-year pair contains the number of pages in the hits produced by the search for that journal-year pair. Hit pointer grid 821 is also similar. There, entry 822 for each journal-year pair contains a pointer to an array of pointers to the data base entries 625 for the hits. As will be explained in more detail later, hit pointer grid 821 is used to produce the display in article view window 229.

Figure 9:
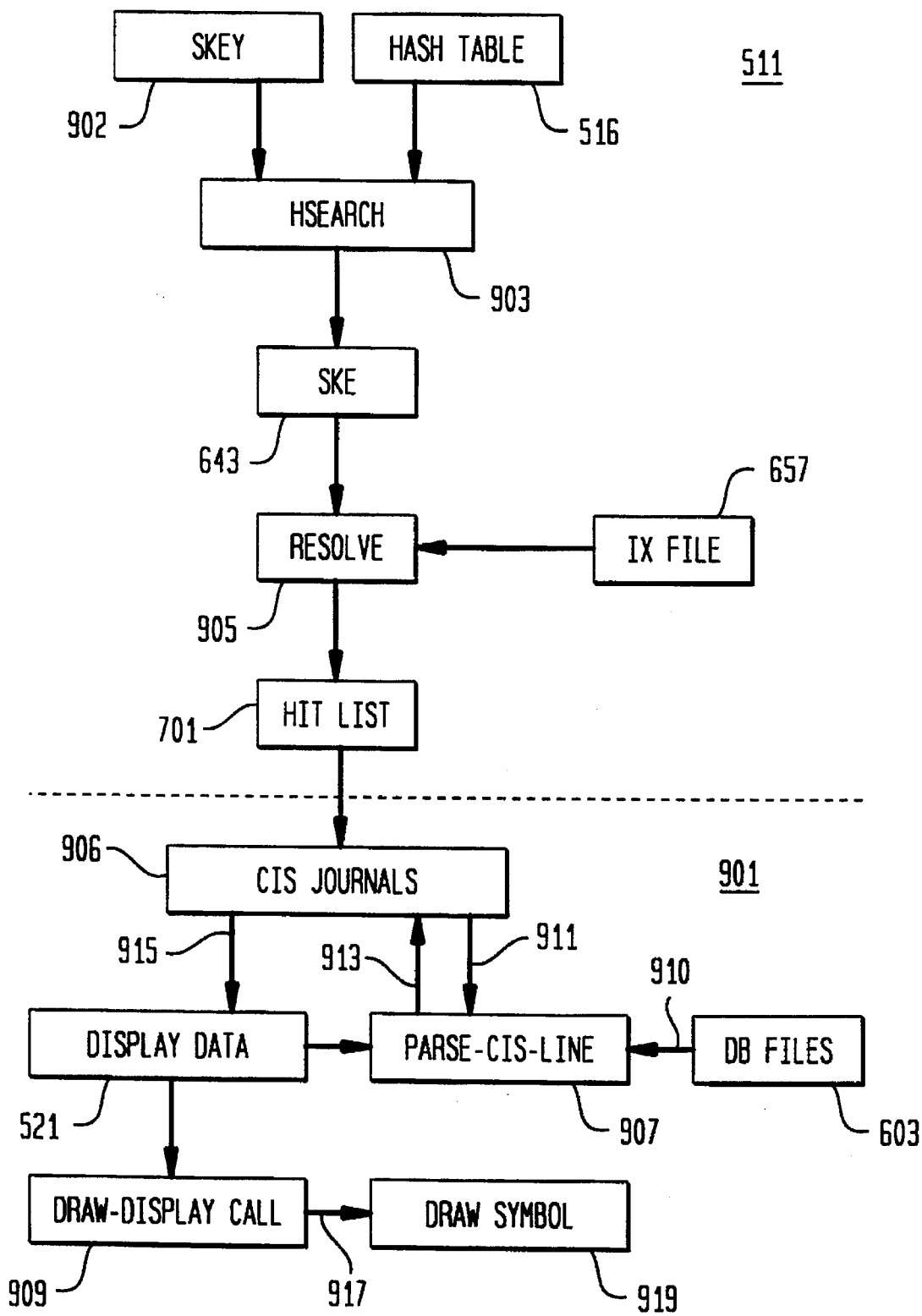
FIG. 9 is a diagram showing production of display 201.

Operation of the Implementation: FIG. 9

FIG. 9 is a diagram 901 showing how routines in display code 607 and the files and data structures just describe interact to produce display 201. By the time a search begins, data base files 515 have been mapped into address space 503 and hash table 516 has been produced from INDEX file 641. Routines belonging to search code 511 appear in FIG. 9 in the portion labelled 511; those belonging to display code 513 appear in the portion labelled 513.

As previously indicated, a user specifies a search by typing the term to be searched for into choices-popup window 207 and then pushing the Do it button in the window. The term which was typed into the window appears in FIG. 9 as search key (SKEY) 902. The routine hsearch applies search key 902 to hash table 516 and returns search key entry 643 for search key 902 from hash table 516. Search key entry (SKE) 643 of course contains information permitting location of all of the hits for the search key in the data base. Search key entry 643 is provided to the routine resolve, which reads each data base file entry 645 in turn. For each hit indicated in search key entry 643, resolve makes an entry in hit list 701 which contains a pointer to data base entry 625 for the hit. If there is only one hit indicated by the entry 645, resolve uses first hit loc. 653 to derive the pointer; if there is more than one, resolve uses IxFile 657 for the data base file 623 corresponding to the data base file entry 645 to obtain the remaining locations, and derives the pointers for hit list 657 from those locations.

Display data 521 is constructed by the routine cisjournals 906. cisjournals 906 obtains the information for display data 621 from data base files 603 with the help of parse_cis_line 907, which takes a pointer to a data base entry 625 and returns the fields in the data base entry 625. cisjournals 906 first constructs journal list 801. It does this by going through hit list 701 and providing each pointer in the list to parse_cis_line 907, as shown by arrow 913. parse_cis_line 907 uses the pointer to locate data base entry 625 and return it to cisjournals 906. cisjournals 906 makes a tree from the journal titles 627 from the returned data base entries 625 which has one node for each unique journal title in the data base entries 625 returned by parse_cis_line 907. After cisjournals 906 has worked through hit list 701, it copies the journal titles in the tree into the journal name fields 803 of journal list 801. Then it sorts journal list 801 so that the titles are in alphabetical order. The next step is to initialize all entries indicating number of hits, number of pages, and pointers to hits in arrays 807, 811, 815, 819, and 821 to 0. Then cisjournals 906 puts values in arrays 807, 811, 817, 819, and 821 by again working thorough hit list 701 and providing each pointer to parse_cis_line 907, which again extracts data base entry 625 specified by the pointer.

For each data base entry 625 returned by parse_cis_line 907, cisjournals 906 first takes the title in JTITLE 627 and uses it to find the index in journal list 801 of that title in journal list 801. Then JHITS 809 in the corresponding entry of JHITLIST 807 is incremented. Next, cisjournals 906 takes the value of JYEAR.

626 and uses it to find the entry in YHITLIST 811 for the year and increments that entry 813. Then the routine takes the values of PSTART 631 and PEND 633, and uses them to compute the number of pages specified by the hit. That value is then added to the value presently in number of pages element 818 of number of pages grid 819 for the journal and year specified in database entry 625. Then the value in number of hits element 817 in number of hits grid 815 is incremented. Finally, the line pointer 703 in hit list 701 which was used to obtain data base entry 625 is placed in hit pointer list 822 in the entry in hit pointer grid 821 for the journal and the year.

Thus, after cisjournals 906 has worked through hit list 701 the second time, journal list 801 contains a sorted list of journal names, JHITLIST 807 contains the total number of hits for each journal, YHITLIST 811 contains the total number of hits for each year, no. of hits grid 815 contains the number of hits for each journal-year pair, no. of pages grid 819 contains the total number of pages in the hits for each journal-year pair, and hit pointer grid 821 contains the pointers to the data base entries 625 for each hit for each journal-year pair.

Display data 521 is used by the callback routine draw_display_call 909, which is called whenever a user interaction with display 201 requires that the entire display be redrawn. The entire display 201 is redrawn in a screen buffer in the background, which is then displayed when the redrawing is complete. The first step in the redraw operation is drawing journal list 209 and bar plot 223. The names in journal list 209 come from journal list 801 and the totals come from JHITLIST 807. Next, the years in year list 211 and bar plot 221 are drawn; the totals come from YHITLLIST 811. Then the symbols are drawn in grid 213 for each year-journal pair. The drawing is done by the routine draw_symbol 910, which is invoked by draw_display_call 909 if the number of hits in element 817 for the year-journal pair is greater than the value specified in THRESHOLD 825.

Draw_symbol 919 is invoked with the indices of the year-journal pair in grids 815 and 819 and with an argument indicating whether the redraw is part of an entire screen redraw (all indicated by arrow 917). draw_symbol 919 uses the indices to locate number of hits element 817 and obtains the value in the element. Then the routine proceeds as follows: if display mode 827 indicates that the number of hits is to be displayed, the routine computes a symbol size value using the expression scale_size * number_of_hits/maxhits. If display mode 827 indicates that the total number of pages for the hits is to determine symbol size, draw_symbol obtains the value of number of pages 818 for the article-year pair and computes the symbol size value like this: scale_size * number_of_pages/maxpages.

Then the location of the symbol 215 or 217 in grid 213 is computed and the symbol is drawn. If the number of hits in element 817 is 1, the symbol is drawn as a white rectangle having the size specified by the symbol size value; if the number of hits is 2, the symbol is drawn as a blue circle having the size specified by the symbol size value; otherwise, it is drawn as a red circle having the size specified by the symbol size value. When draw_symbol draws a symbol in response to pointer 107 being positioned on the symbol, it proceeds exactly as set forth above, except that the symbol color is green.

After having used draw_symbol to draw the symbol corresponding to each value in number of hits grid 815 or no. of pages grid 819, draw_display_call 909 prints field 225, completing those portions of display 201 not contained in other windows.

Responding to Selection of a Symbol

As pointed out in the description of display 201, when pointer 107 is moved onto a symbol in grid 213, the symbol, the journal in column 209, and the year in row 211 are all displayed in green and the name of the journal, the year, and the number of hits appear below grid 213. That is done as by employing draw_symbol 919 to redraw the symbol in green; then the journal and year for the symbol are redrawn in green; finally, the indices of the entry in grid 815 or 819 are used to locate the journal name in journal list 801 and the number of hits for the journal name in JHITLIST 811. These, and the year of the journal (again determined from the indices) are written below grid 213.

As further pointed out, when pointer 107 is moved onto a symbol in grid 213 and the leftmost button of mouse 111 is depressed, information 231 for the hits represented by the symbol appears in article view window 229. In the preferred embodiment, information 231 is obtained by means of hit pointer grid 821 and parse_cis_line 907. Article view window 229 is a window into a buffer which contains the information, and as previously explained, article view window 229 may be scrolled through the information. In the preferred embodiment, when the leftmost button of mouse 111 is depressed while pointer 107 is on a symbol, the pointers in the list of pointers at the entry in hit pointer grid 821 which has the publication and year specified by the symbol are provided one at a time to parse_cis_line 907, which returns data base entry 625 for the hit. The information from entry 625 which is to be displayed in article view window 229 is then output to the buffer. Thus, by scrolling article view window 229, the user of the system can see that information for each of the hits. In the preferred embodiment, the information provided from data base entry 625 includes the author, the title, the journal, the pages, the year, and the keywords. Provision of the keywords of course permits the user to make other searches using the keywords.

CONCLUSION

The foregoing Detailed Description has disclosed a new technique for displaying the results of queries and has shown how the technique can be used to display a query result as a set of results of subqueries. The Detailed Description has further shown how the technique can be used to obtain views of information not previously possible and how the displays produced using the technique may be interactively controlled.

While the preferred embodiment disclosed herein is the best presently known to the inventors, it will be apparent to those of ordinary skill in the art that many other implementations which employ the principles of the inventions disclosed herein are possible. Further, while grid 213 is a particularly advantageous form of display, the principles of the inventions disclosed herein apply to any arrangement in which an area of a display is related to a subquery and a symbol indicating the results of the subquery is displayed in the area. Moreover, the uses of the techniques of the invention are not limited to those disclosed herein. Rather, the techniques may be used in any situation in which subqueries may be related to areas of the screen, and the variations in the appearance of the symbols may represent any kind of information about the results of the subquery.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted with the full breadth permitted by the law.

What is claimed is:

1. Apparatus for showing the results of a query performed on a data base by a data base system, the apparatus including
   display generation means coupled to the data base system for receiving the results and generating a display therefrom; and
   display production means coupled to the display generation means for receiving and producing the generated display,
   and the apparatus having the improvement comprising:
      an n-dimensional array wherein each dimension represents a set of attribute values;
      a set of first areas in the display, each first area corresponding to a subquery which specifies a particular set of n attribute values specified in the query; and
      a symbol of varying appearance which appears in an area of the first areas, the varying appearance operating to indicate a characteristic of the results of the subquery corresponding to the area.

2. The apparatus set forth in claim 1 wherein:
   the symbol of varying appearance has a shape which varies according to the characteristic of the results of the subquery corresponding to the area.

3. The apparatus set forth in claim 1 wherein:
   the symbol of varying appearance has a size which varies according to the characteristic of the results of the subquery corresponding to the area.

4. The apparatus set forth in claim 1 wherein:
   the symbol of varying appearance has a color which varies according to the characteristic of the results of the subquery corresponding to the area.

5. The apparatus set forth in claim 1 wherein:
   the characteristic according to which the appearance varies is a number of hits produced by the subquery.

6. The apparatus set forth in claim 1 wherein:
   the characteristic according to which the appearance varies is a number of pages in number of hits produced by the subquery.

7. The apparatus set forth in claim 1 further comprising:
   means in the display generation means for establishing a threshold value for the characteristic, the symbol appearing in a given one of the first areas only if the subquery corresponding to the given area produces a result in which the characteristic exceeds the threshold value.

8. The apparatus set forth in claim 7 wherein:
   the means for establishing a threshold value is interactive.

9. The apparatus set forth in claim 1 further comprising:
   means in the display generation means for adjusting the size of the symbol in the area of the first areas.

10. The apparatus set forth in claim 9 wherein:
    the means for adjusting the size of the symbol is interactive.

11. The apparatus set forth in claim 1 further comprising;
    means for selecting the symbol; and
    means in the display generation means responsive to selection of the symbol by the symbol selecting means for generating the display such that the display shows further information about the subquery represented by the symbol.

12. The apparatus set forth in claim 11 wherein:
    the further information is information about the hits produced by the subquery.

13. The apparatus set forth in claim 1 further comprising;
    means for interactively specifying the query; and
    means in the display generation means responsive to the means for interactively specifying the query for producing the first areas as required by the query and the subqueries.

14. The apparatus set forth in claim 13 wherein:
    there is a plurality of means for interactively specifying the query; and
    the means for producing the first areas includes means for encaching the results of the subqueries, whereby the the sets of first areas corresponding to the queries specified by the plurality of means for interactively specifying the query may be displayed in rapid succession.

15. The apparatus set forth in claim 1 further comprising:
    a set of second areas in the display for identifying the subqueries, the areas in the set of second areas being spatially related to the set of first areas such that the subquery to which a given area of the first areas belongs can be determined by the area of the set of second areas related thereto.

16. The apparatus set forth in claim 15 wherein:
    there is an area of the second areas corresponding to each of the dimensions of the array.

17. The apparatus set forth in claim 16 wherein:
    the second areas are located along edges of the array.

18. The apparatus set forth in claim 17 wherein:
    the number of dimensions is 2;
    there is a first second area located along a first edge of the array and a second second area located along a second edge of the array which is adjacent to the first edge; and
    the first second area and the second second area relate to the set of first areas such that a first line which passes through a given one of the first areas and is parallel to the first edge and a second line which passes through the given one of the first areas and is parallel to the second edge pass through the portions of the first second area and the second second area which define the subquery for the given one of the first areas.

19. The apparatus set forth in claim 16 further comprising:

means for selecting the symbol; and means in the display generation means responsive to the means for selecting the symbol for changing the appearance of the symbol and of second areas which correspond to the area in which the symbol appears.

20. Apparatus for showing the results of a query performed on a data base by a data base system, the apparatus including display generation means coupled to the data base system for receiving the results and generating a display therefrom; and display production means coupled to the display generation means for receiving and producing the generated display, and the apparatus having an improved display comprising:

a symbol at each of one or more vertices in the display, the vertices being vertices in an n-dimensional array wherein each dimension represents an attribute of the data and positions in each dimension represent values of the attribute represented by the dimension, the symbol at a given vertex representing hits in the data base for the attribute values corresponding to the given vertex, and the symbol having an appearance which varies according to the number of hits.

* * * * *